July 20, 1954
W. A. FEARS ET AL
2,684,273
AGITATOR UNIT
Filed Dec. 14, 1951
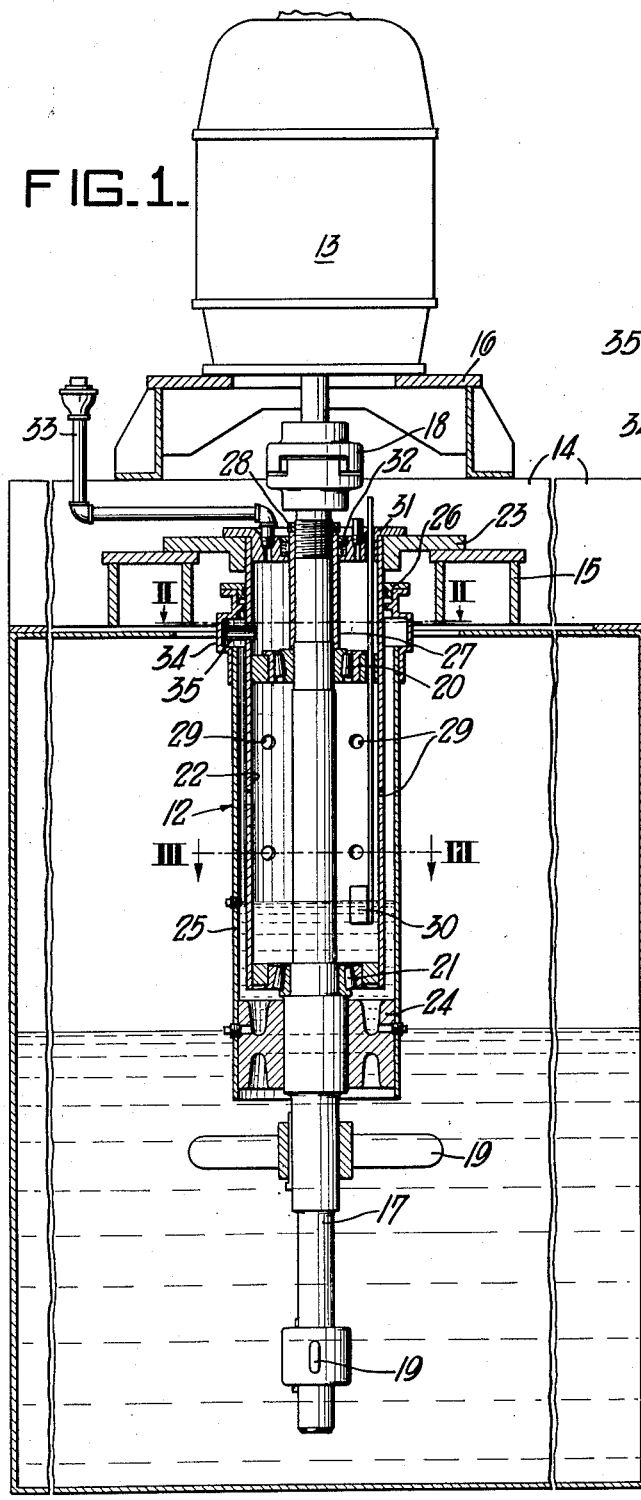
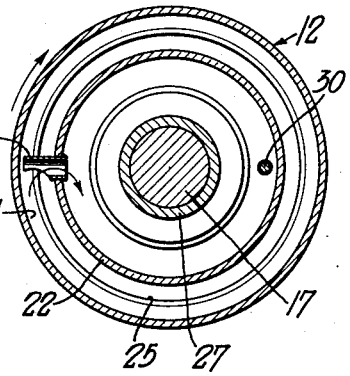
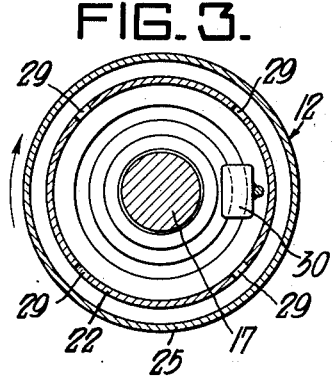
*Inventors:*
WILLIAM A. FEARS and
ELMER G. STEUBER,
by: Donald G. Dalton
  *their Attorney.*

Patented July 20, 1954

2,684,273

UNITED STATES PATENT OFFICE 2,684,273

AGITATOR UNIT

William A. Fears, Concord, and Elmer G. Steuber, Pittsburg, Calif., assignors to United States Steel Corporation, a corporation of New Jersey Application December 14, 1951, Serial No. 261,832

1 Claim. (Cl. 308—134.1)

This invention relates to an improved unit for agitating liquids.

An object of the invention is to provide an improved agitator unit which has a rotatable blade shaft mounted in spaced apart bearings and yet does not require packing below the level of the agitated liquid for excluding this liquid from the bearings.

A further object is to provide an agitator unit which has an improved system for continuously lubricating its bearings.

A more specific object is to provide an improved agitator unit which has a rotatable blade shaft mounted in spaced apart bearings and a jacket rotatable with the shaft and enclosing the bearings from the agitated liquid and forming a lubricant reservoir.

These and other objects will become more apparent after referring to the following specification and attached drawing, in which:

Figure 1 is a vertical sectional view of a tank equipped with an improved agitator unit which embodies features of the present invention; and Figures 2 and 3 are horizontal sectional views taken on lines II—II and III—III respectively of Figure 1.

Figure 1 shows a tank 10, which is adapted to contain liquid approximately to the level indicated, and an agitator unit 12 and drive motor 13 therefor, which are supported on beams 14 across the top of the tank. The agitator unit is mounted on a base 15 and the motor on a base 16, both carried by said beams.

In accordance with the present invention, the agitator unit 12 comprises a blade shaft 17, which is connected at its upper end to motor 13 through a flexible coupling 18 and carries blades 19 adjacent its lower end for agitating the liquid on rotation of the shaft. Shaft 17 is rotatably mounted in vertically spaced apart upper and lower antifriction bearings 20 and 21. These bearings in turn are mounted in a stationary sleeve 22 which is suspended from a mounting flange 23 attached to base 15. A collar or bushing 24 is fixed to shaft 17 between its lower bearing 21 and the uppermost blade 19. A jacket 25 is fixed at its lower end to said bushing and at its upper end rotatably receives the outside of sleeve 22 in an oil seal 26. Thus the jacket and bushing completely enclose both bearings 20 and 21 from liquid in the tank 10. A spacer 27 is mounted on shaft 17 above its upper bearing 20, and lock nuts 28 are threadedly engaged with the shaft above said spacer. The spacer and lock nuts form a means for adjusting friction on the bearings 20 and 21.

The jacket 25 and sleeve 22 form a reservoir for lubricant, which is at a level about as indicated in Figure 1 when the unit is not running. Sleeve 22 has a plurality of openings 29 through which the lubricant can flow freely. A float and indicator rod 30 can be included for furnishing a readily observable means showing the lubricant level. A packing gland 31 and packing 32 preferably are carried by the mounting flange 23 and rotatably receive the spacer 27 for sealing the upper end of the unit and thus keeping the lubricant clean and free from contamination. A filler pipe 33 is connected to gland 31 and extends outwardly and upwardly to a convenient location for introducing lubricant to the unit.

The upper part of jacket 25 has an annular pocket 34 situated just below the oil seal 26 and above the upper bearing 20. An oil scoop 35 is fixed to the outside of sleeve 22 and extends into said pocket. Rotation of shaft 17 and jacket 25 creates a centrifugal force which throws the lubricant to the outer part of said jacket and upwardly into its pocket 34. The oil scoop 35 directs lubricant from the pocket inwardly and downwardly into the upper bearing 20, from which it drops into the lower bearing 21. Thus there is a continuous flow of lubricant through both bearings as long as the unit is running.

From the foregoing description it is seen that the agitator unit has spaced apart bearings for its blade shaft, thus eliminating vibrations usual with cantilever-type shafts. At the same time both bearings are fully enclosed from liquid in the tank without the need for packing. Both bearings always are properly lubricated by a continuous flow of lubricant.

While one embodiment of our invention has been shown and described it will be apparent that other adaptations and modifications may be made without departing from the scope of the following claim.

We claim:

In an agitator unit which includes a vertical shaft adapted to be suspended in a tank, a coupling on the upper end of said shaft adapted to be connected to a drive, and driven elements on the lower end of said shaft, the combination with said shaft of a mounting device comprising a sleeve, means adapted to fix said sleeve at its upper end to a support, a pair of vertically spaced bearings within the bore of said sleeve rotatably carrying said shaft in spaced relation to the interior surface of said sleeve, the upper end of said shaft and said coupling extending above the top of said sleeve, the lower end of said shaft and said driven elements extending below the bottom of said sleeve, a bushing fixed to said shaft below the lowermost bearing, a jacket fixed adjacent its lower end to said bushing and being rotatable with said shaft and enclosing said sleeve and said bearings in spaced relation to the outer surface of said sleeve, the walls of said sleeve having passages between the inside and outside thereof, the spaces between said jacket and said sleeve and between said sleeve and said shaft constituting a lubricant reservoir, means for circulating lubricant from said reservoir through said bearings, a lubricant seal between the outside of said sleeve and the inside of said jacket adjacent the upper end of the latter, and a closure for the upper end of said sleeve surrounding said shaft.

References Cited in the file of this patent

UNITED STATES PATENTS

| Number | Name | Date |
|---|---|---|
| 1,113,452 | Lewis | Oct. 13, 1914 |
| 1,479,304 | Krogh | Jan. 1, 1924 |
| 1,730,713 | Alexander | Oct. 8, 1929 |
| 2,221,725 | Shipman | Nov. 12, 1940 |
| 2,349,131 | Anderson | May 16, 1944 |

FOREIGN PATENTS

| Number | Country | Date |
|---|---|---|
| 377,189 | Germany | June 12, 1923 |
| 505,549 | Germany | Aug. 22, 1930 |